(12) United States Patent
Noh

(10) Patent No.: US 11,450,947 B2
(45) Date of Patent: Sep. 20, 2022

(54) ANTENNA MODULE

(71) Applicant: AMOTECH CO., LTD., Incheon (KR)

(72) Inventor: Jin Won Noh, Gwangju (KR)

(73) Assignee: AMOTECH CO., LTD., Incheon (KR)

( * ) Notice: Subject to any disclaimer, the term of this patent is extended or adjusted under 35 U.S.C. 154(b) by 86 days.

(21) Appl. No.: 17/044,808

(22) PCT Filed: Apr. 30, 2019

(86) PCT No.: PCT/KR2019/005173
§ 371 (c)(1),
(2) Date: Oct. 1, 2020

(87) PCT Pub. No.: WO2019/212220
PCT Pub. Date: Nov. 7, 2019

(65) Prior Publication Data
US 2021/0098862 A1 Apr. 1, 2021

(30) Foreign Application Priority Data

May 4, 2018 (KR) .................. 10-2018-0051562
May 4, 2018 (KR) .................. 10-2018-0051563

(51) Int. Cl.
*H01Q 1/24* (2006.01)
*H01Q 7/00* (2006.01)
*H01Q 1/22* (2006.01)

(52) U.S. Cl.
CPC .............. *H01Q 1/243* (2013.01); *H01Q 7/00* (2013.01); *H01Q 1/2208* (2013.01)

(58) Field of Classification Search
CPC ........ H01Q 1/243; H01Q 7/00; H01Q 1/2208; H01Q 1/38; H04B 5/0031
See application file for complete search history.

(56) References Cited

U.S. PATENT DOCUMENTS

2008/0245851 A1* 10/2008 Kowalski ........... G06K 7/10178
235/375
2011/0050164 A1* 3/2011 Partovi ................... H02J 50/10
320/108
(Continued)

FOREIGN PATENT DOCUMENTS

CN 205657171 U 10/2016
JP 6075511 B2 2/2017
(Continued)

OTHER PUBLICATIONS

KR Office Action dated Dec. 13, 2019 as received in Application No. 10-2019-0049885.
(Continued)

*Primary Examiner* — Dimary S Lopez Cruz
*Assistant Examiner* — Bamidele A Jegede
(74) *Attorney, Agent, or Firm* — Maschoff Brennan

(57) ABSTRACT

Provided is an antenna module for increasing a recognition area by using a metal deco or a deco panel of a portable terminal as an auxiliary radiator of a radiation pattern for near field communication. The provided antenna module includes: a metal deco disposed on a rear side of a portable terminal; and a radiation pattern connected to the metal deco, in which the metal deco is spaced at both ends by means of a slit, and one end is configured to be directly connected with one end of a radiation pattern so as to act as an auxiliary radiator of the radiation pattern.

5 Claims, 18 Drawing Sheets

(56) References Cited

U.S. PATENT DOCUMENTS

| | | | | |
|---|---|---|---|---|
| 2013/0207852 | A1* | 8/2013 | Nakano | H01Q 1/2225 343/702 |
| 2013/0307746 | A1* | 11/2013 | Nakano | H01Q 1/2225 343/866 |
| 2014/0333490 | A1* | 11/2014 | Dabov | H01Q 7/00 343/702 |
| 2015/0009077 | A1* | 1/2015 | Lee | H04B 1/3888 343/702 |
| 2015/0054692 | A1* | 2/2015 | Choi | H01Q 1/243 343/702 |
| 2015/0148096 | A1* | 5/2015 | Chae | H04B 5/0081 455/552.1 |
| 2016/0112219 | A1* | 4/2016 | Lee | H04W 4/80 455/77 |
| 2016/0142866 | A1* | 5/2016 | Jang | H01Q 7/00 455/41.1 |
| 2016/0164168 | A1* | 6/2016 | Choi | H01Q 9/26 343/702 |
| 2016/0198070 | A1* | 7/2016 | Nakano | H04N 5/2252 348/374 |
| 2016/0294042 | A1* | 10/2016 | Wang | H01Q 1/48 |
| 2017/0025686 | A1 | 1/2017 | Klewer | |
| 2017/0077597 | A1* | 3/2017 | Gong | H04M 1/026 |
| 2017/0093455 | A1* | 3/2017 | Lee | H01Q 1/243 |
| 2017/0104259 | A1* | 4/2017 | Yosui | H01Q 1/2291 |
| 2017/0194711 | A1* | 7/2017 | Nakano | H01Q 1/242 |
| 2017/0229761 | A1* | 8/2017 | Tomonari | H01Q 1/36 |
| 2017/0237149 | A1* | 8/2017 | Lee | G06Q 20/3278 361/679.21 |
| 2017/0256856 | A1* | 9/2017 | Lilja | H01Q 7/06 |
| 2017/0331173 | A1* | 11/2017 | Ju | H01Q 7/06 |
| 2017/0331191 | A1* | 11/2017 | Komachi | H01Q 7/06 |
| 2018/0048053 | A1* | 2/2018 | Dabov | H01Q 7/00 |
| 2019/0067798 | A1* | 2/2019 | Hao | H04B 5/0031 |
| 2019/0115647 | A1* | 4/2019 | Zhao | H04B 5/0081 |

FOREIGN PATENT DOCUMENTS

| | | |
|---|---|---|
| KR | 10-2014-0136188 A | 11/2014 |
| KR | 10-2015-0040574 A | 4/2015 |
| KR | 2015-0040186 A | 4/2015 |
| KR | 10-2016-0046187 A | 4/2016 |

OTHER PUBLICATIONS

KR Decision to Grant dated Jun. 2, 2020 as received in Application No. 10-2019-0049885.

* cited by examiner

[FIG. 1]
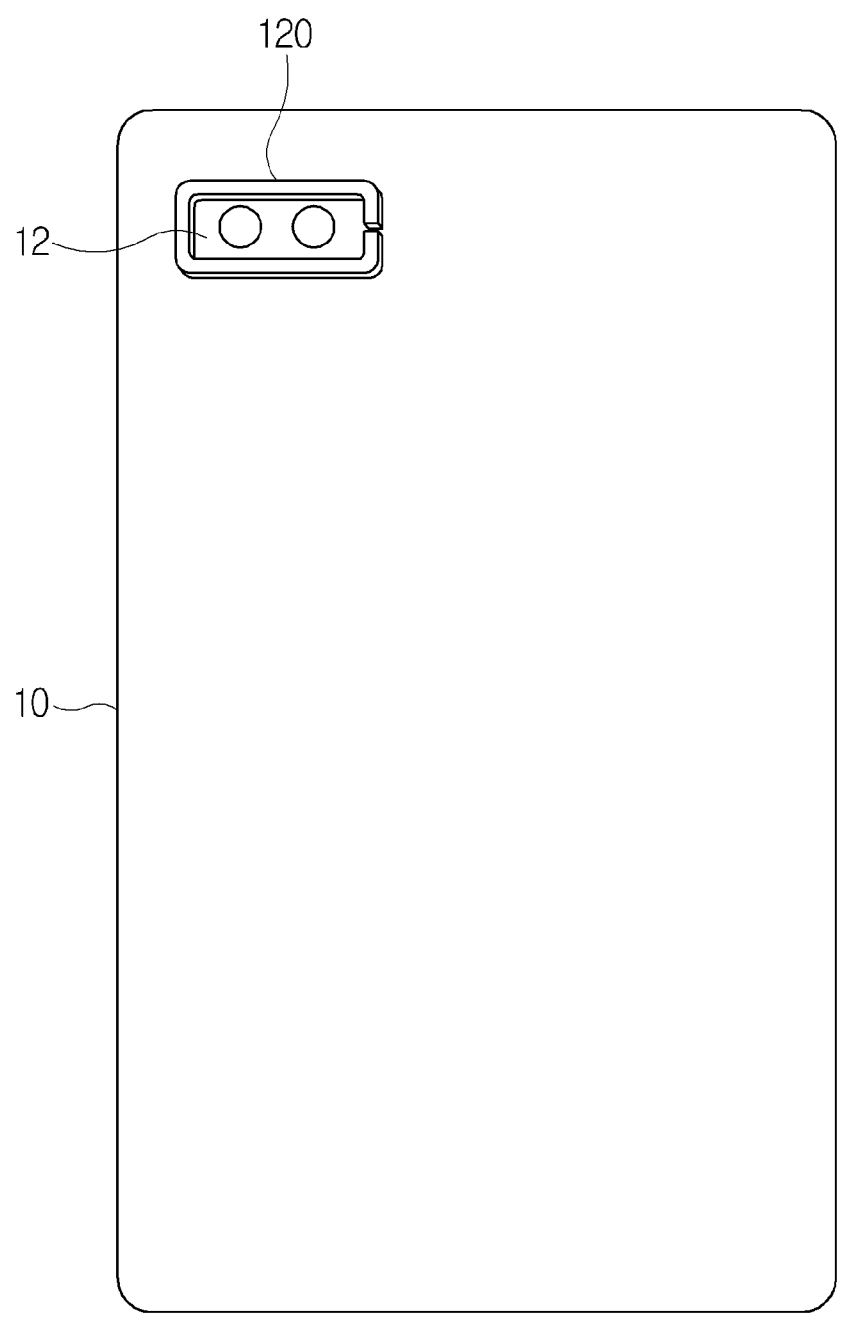

[FIG. 2]
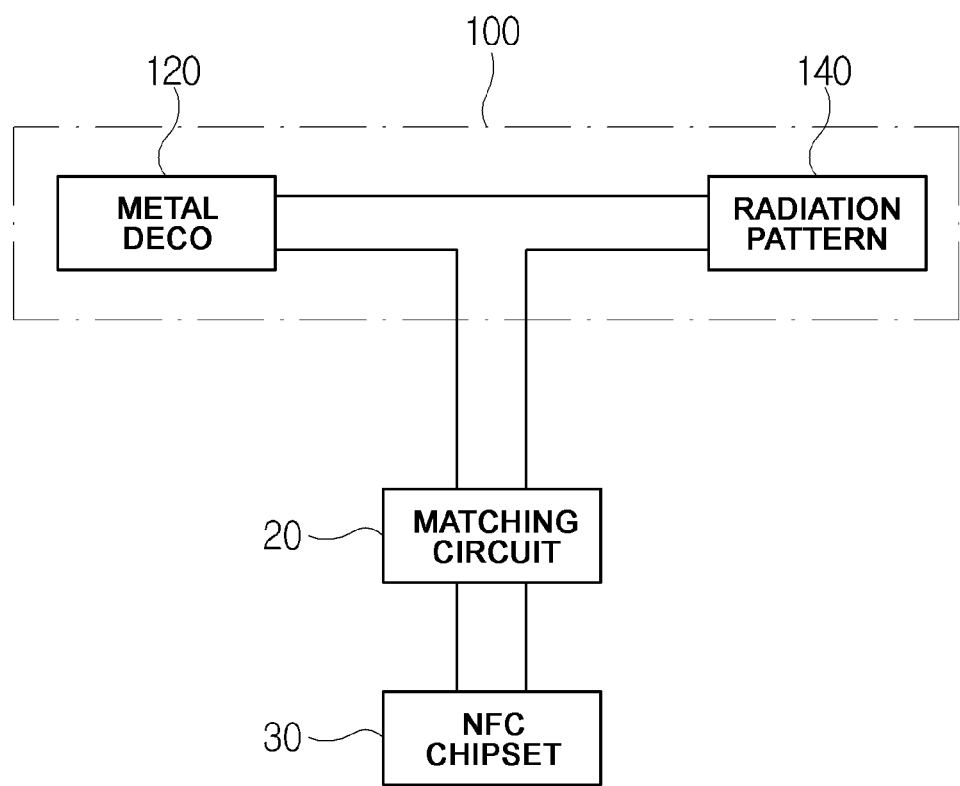

[FIG. 3]
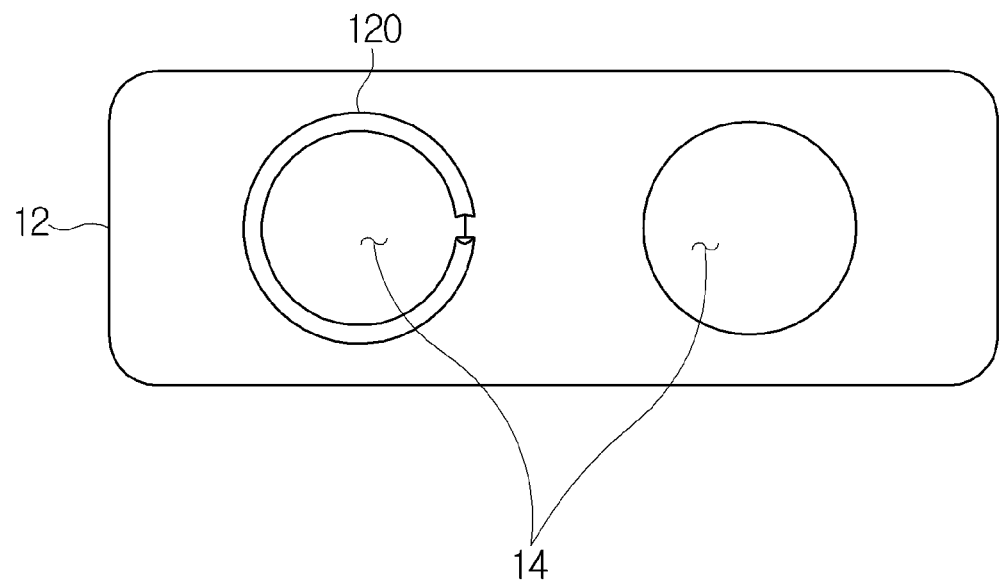
[FIG. 4]
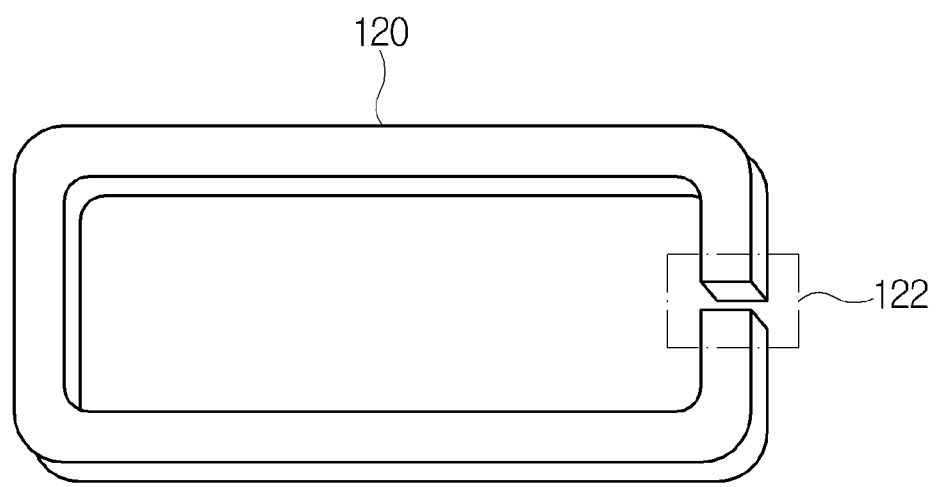

[FIG. 5]
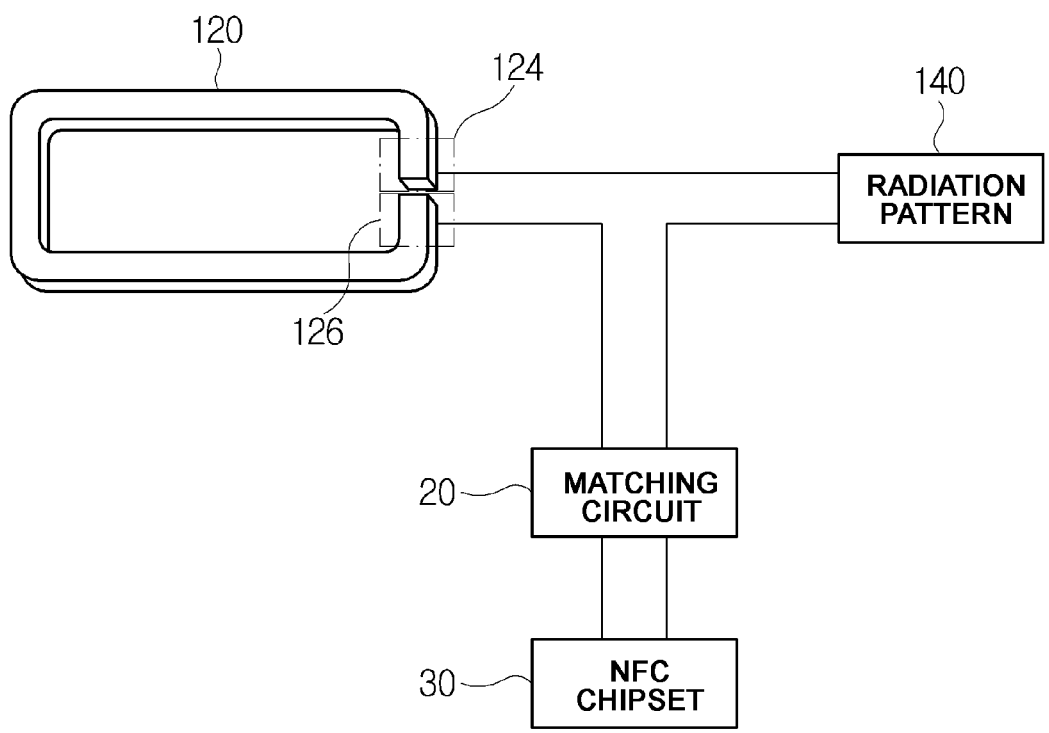

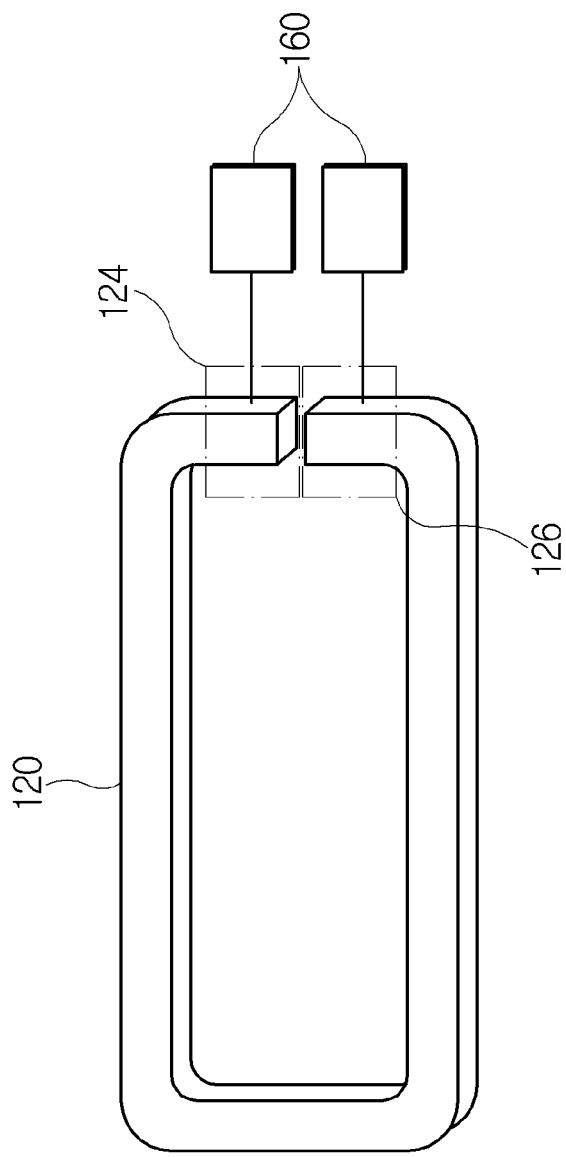
[Fig. 6]

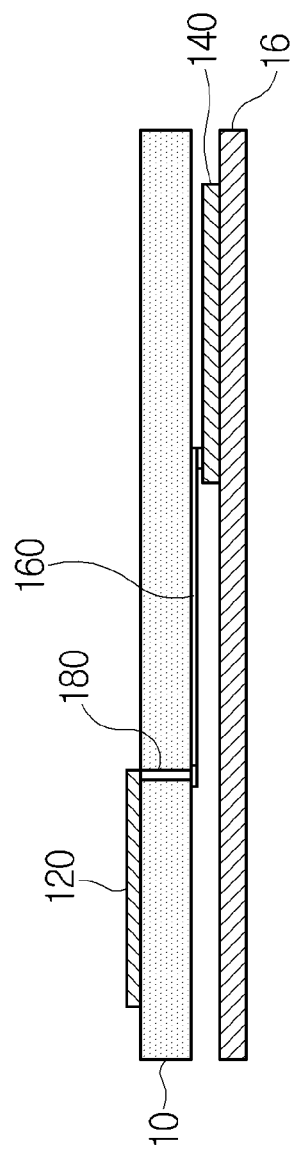
[Fig. 7]

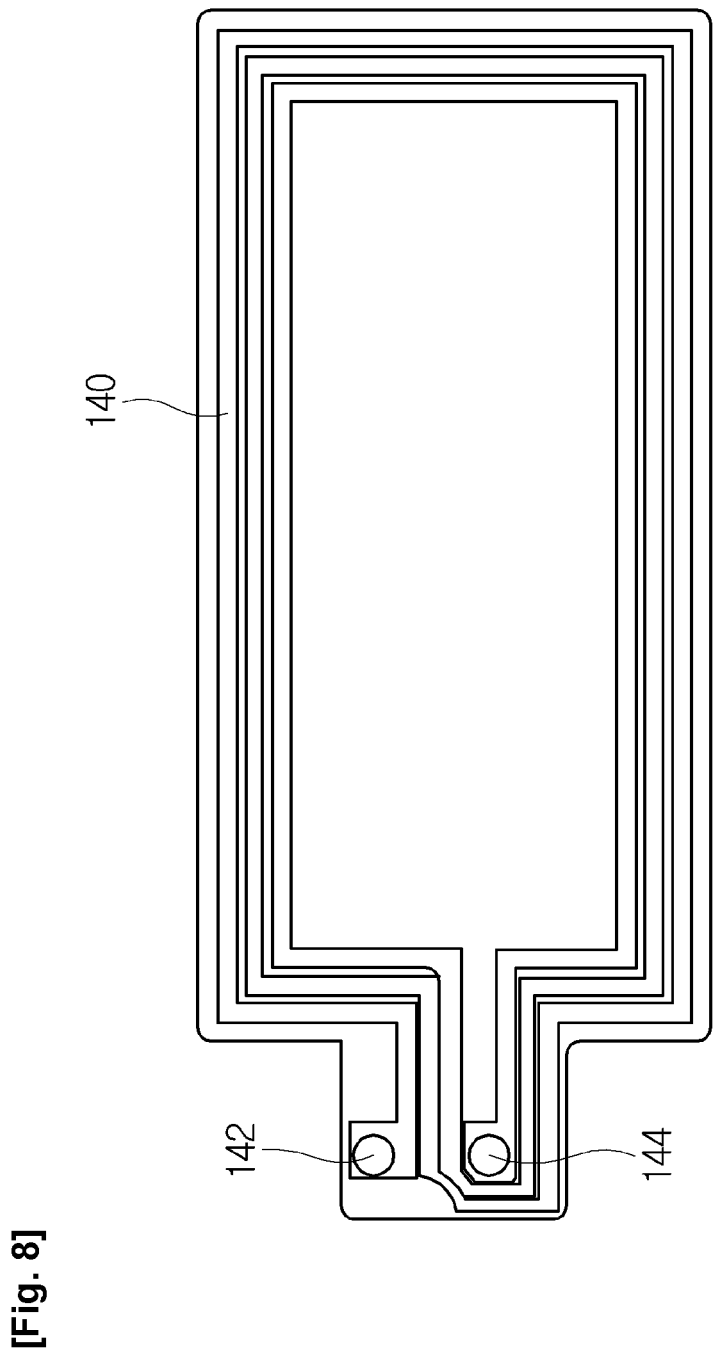
[Fig. 8]

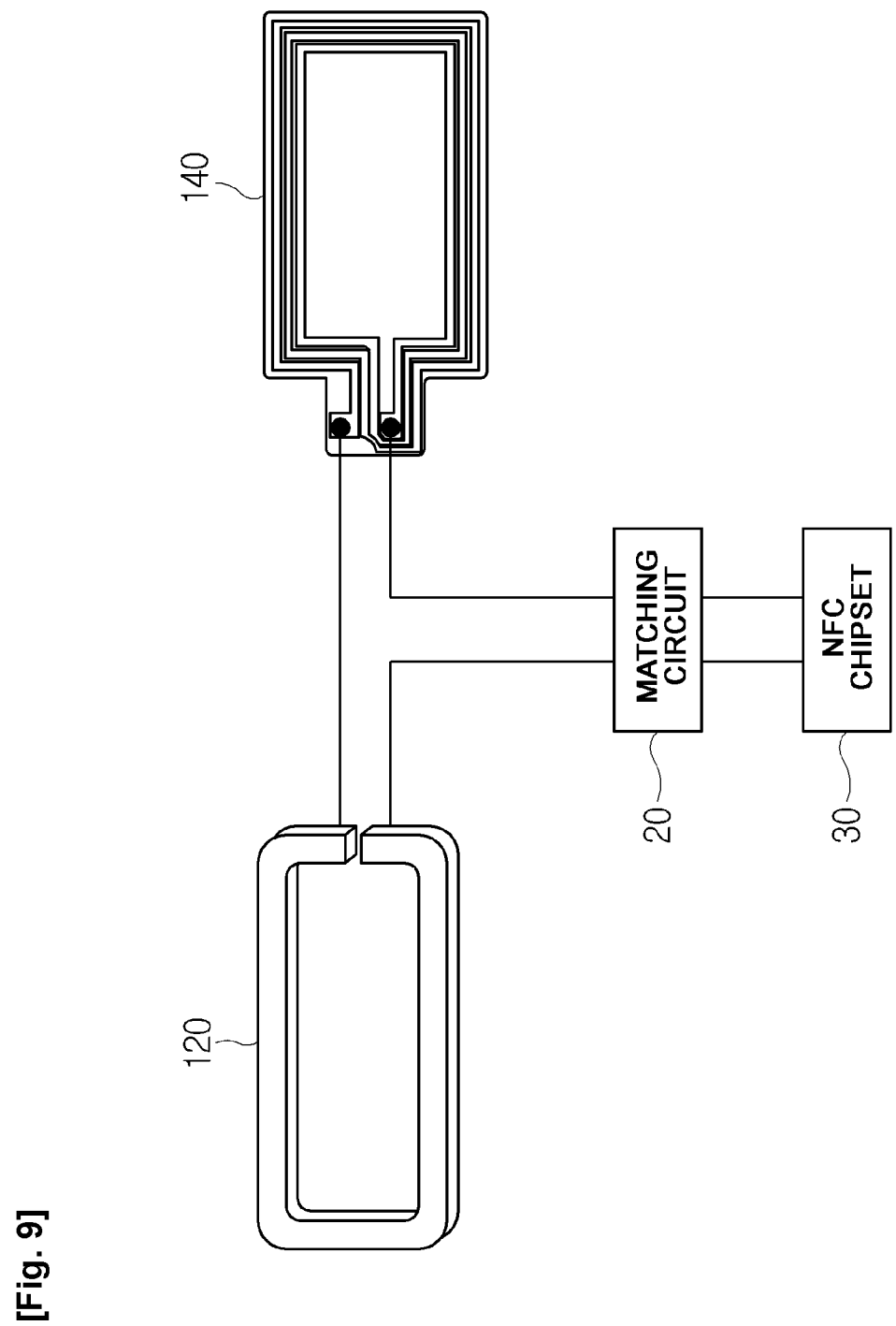

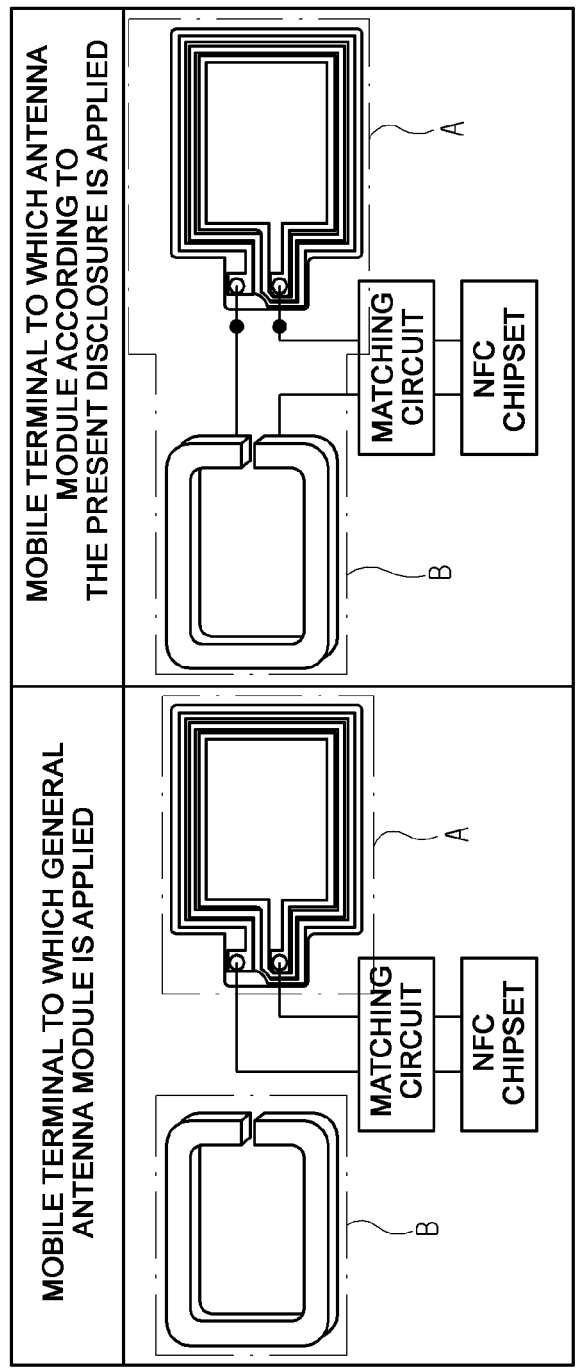
[Fig. 10]

[Fig. 11]

| ITEMS | Card Mode (mm) | | Reader Mode (mm) | | | | | | | | | |
|---|---|---|---|---|---|---|---|---|---|---|---|---|
| | Type A&B | | TYPE 1 | | TYPE 2 | | TYPE 3 | | TYPE F | | | |
| | | | Topaz | | Ultra Light | | Desfire EV1 | | Sony | | | |
| | AREA A | AREA B | AREA A | AREA B | AREA A | AREA B | AREA A | AREA B | AREA A | AREA B | | |
| MOBILE TERMINAL WITH GENERAL ANTENNA MODULE | 64 | X | 28 | X | 35 | X | 17 | X | 10 | X | | |
| MOBILE TERMINAL WITH ANTENNA MODULE OF THE PRESENT DISCLOSURE | 62 | 10 | 28 | 6 | 36 | 7 | 17 | 4 | 10 | 3 | | |

[FIG. 12]
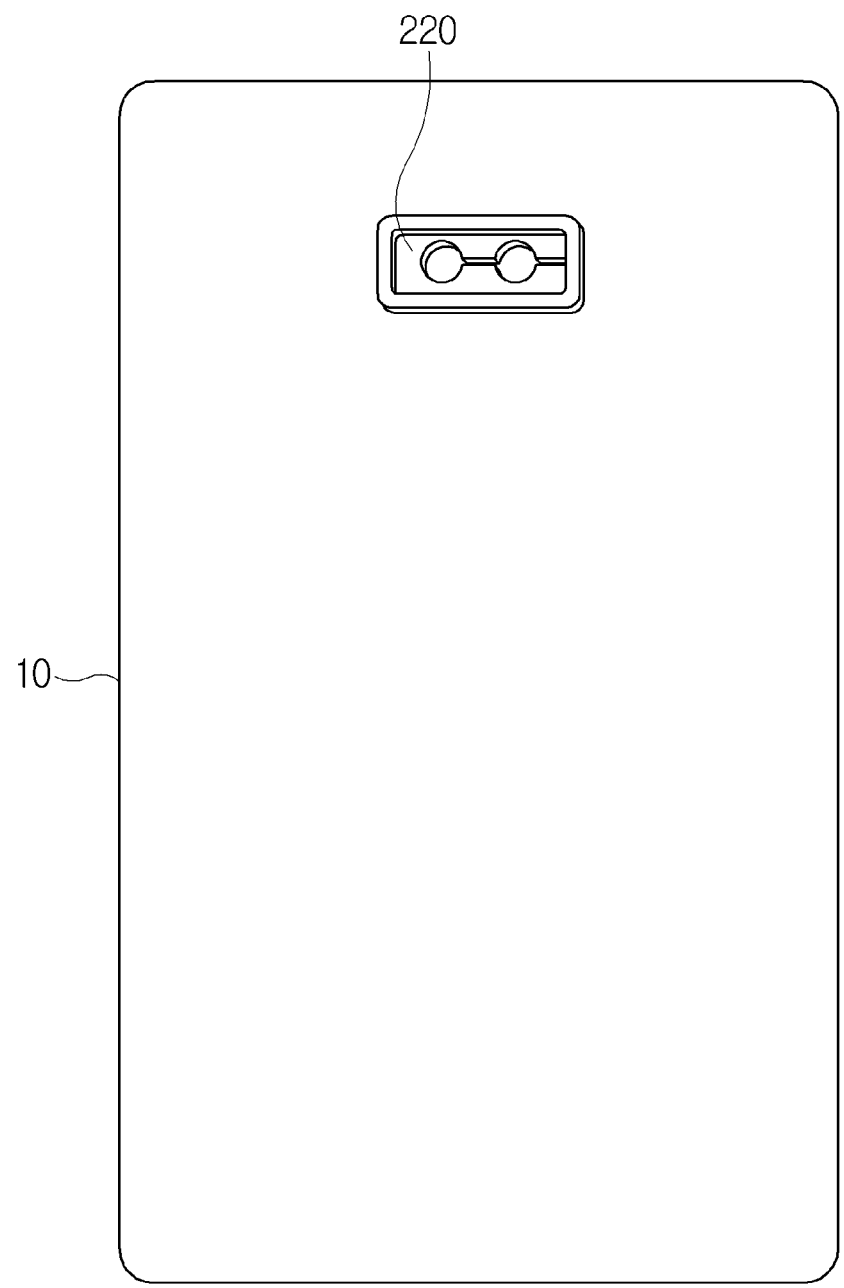

[FIG. 13]
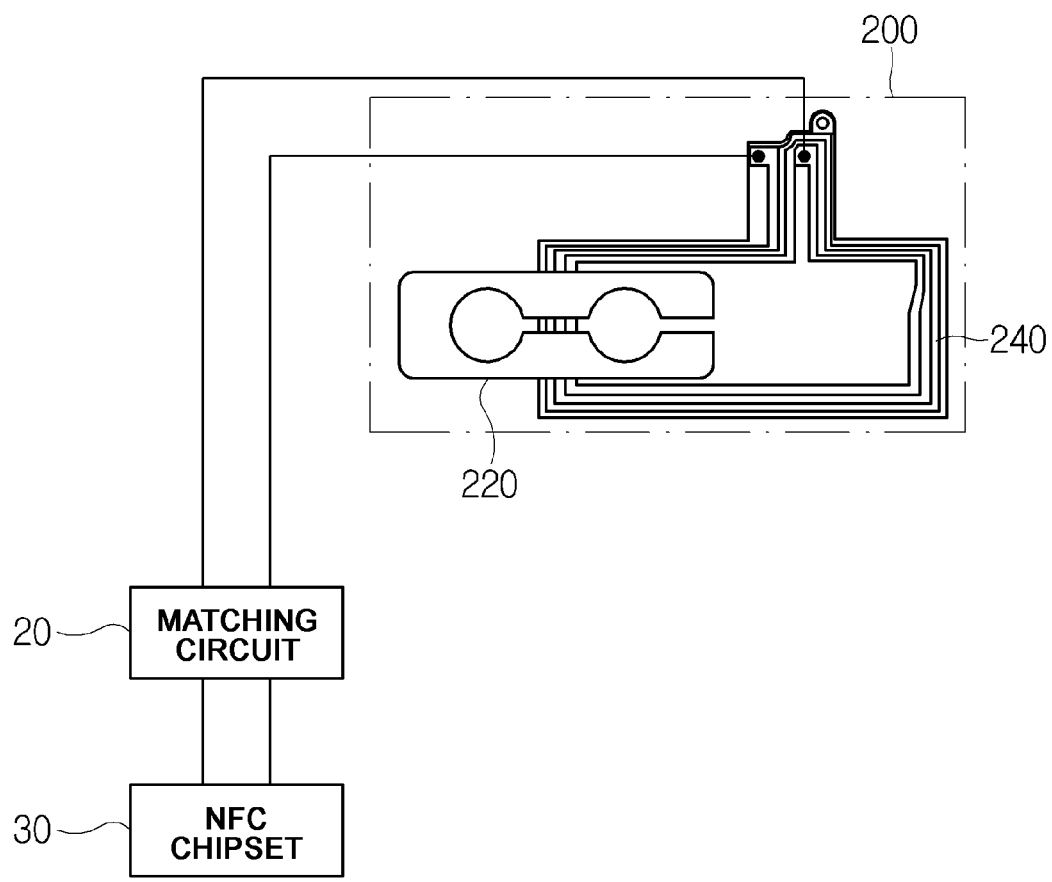

[FIG. 14]
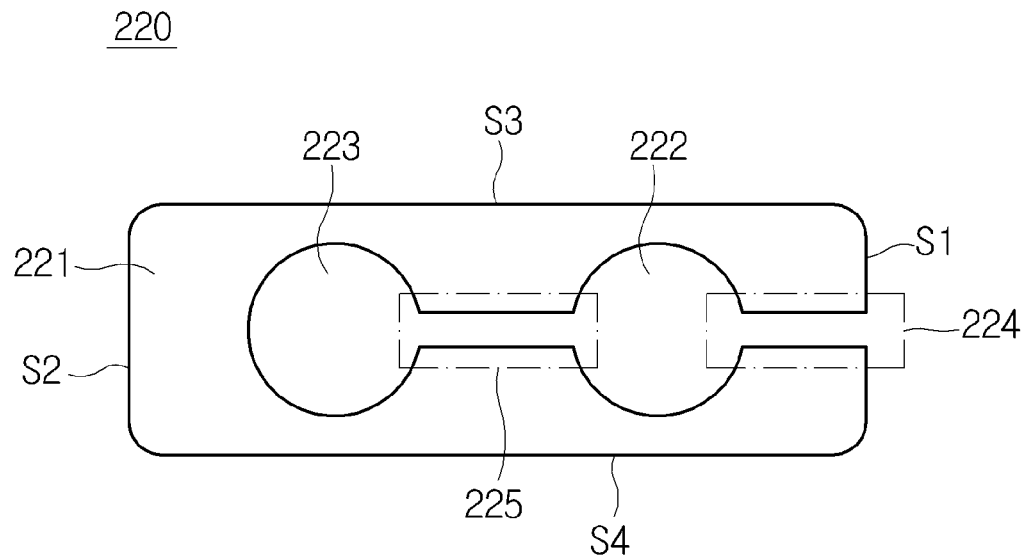
[FIG. 15]
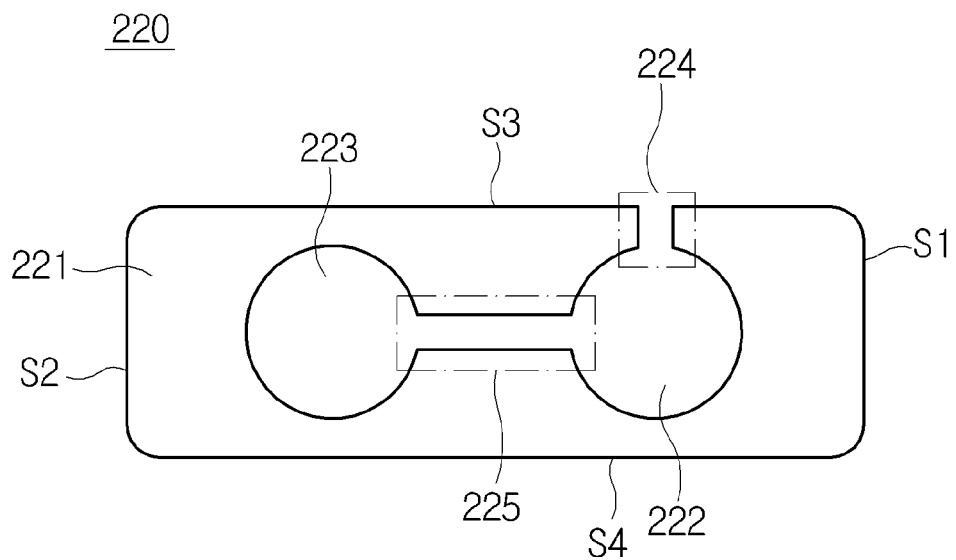

[FIG. 16]
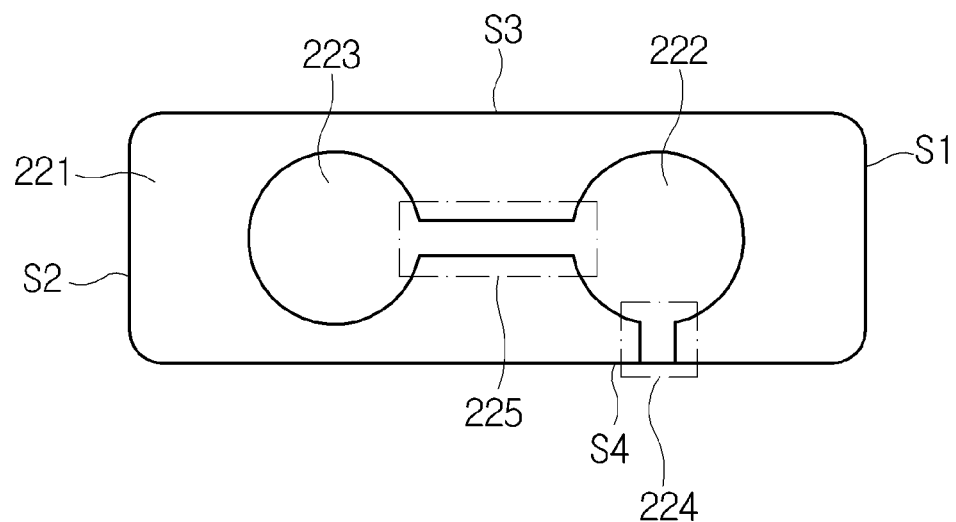
[FIG. 17]
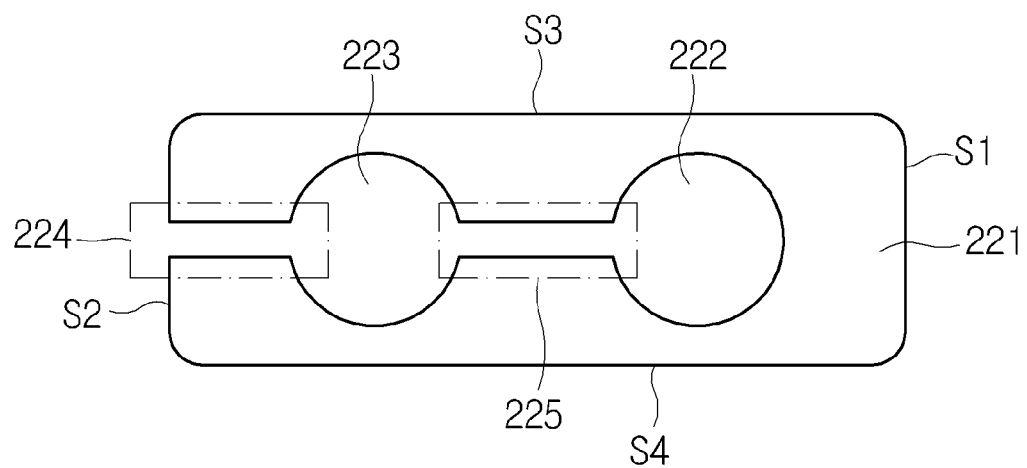

[FIG. 18]
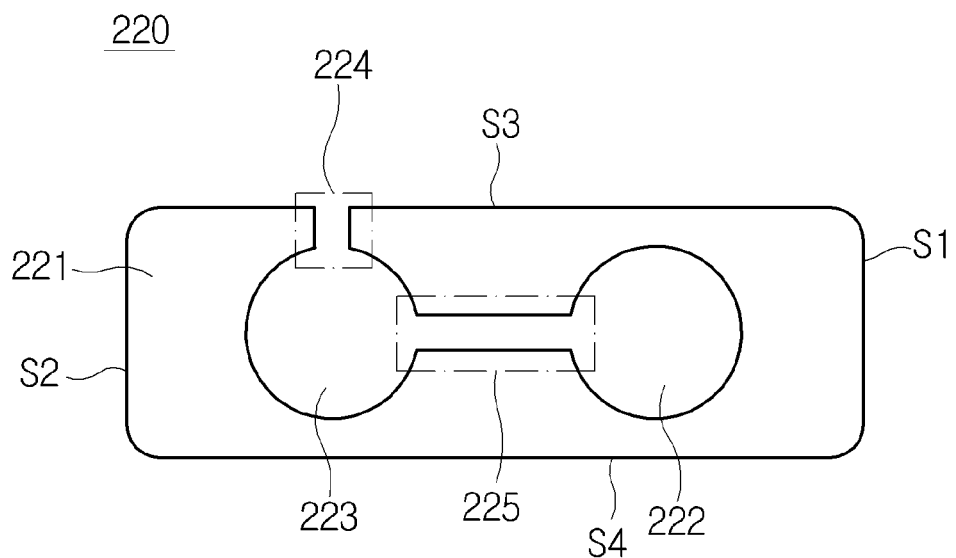
[FIG. 19]
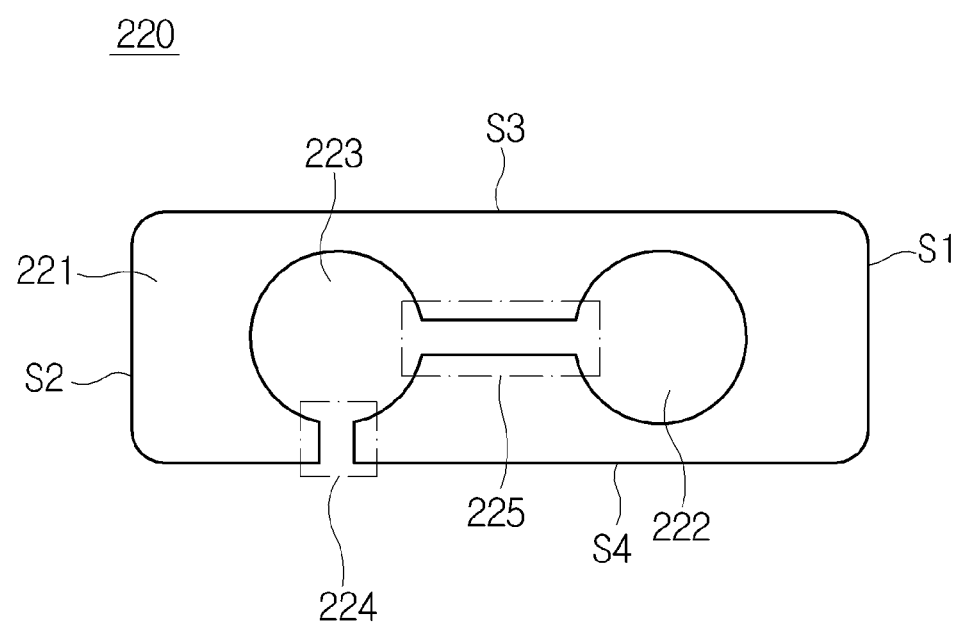

[FIG. 20]
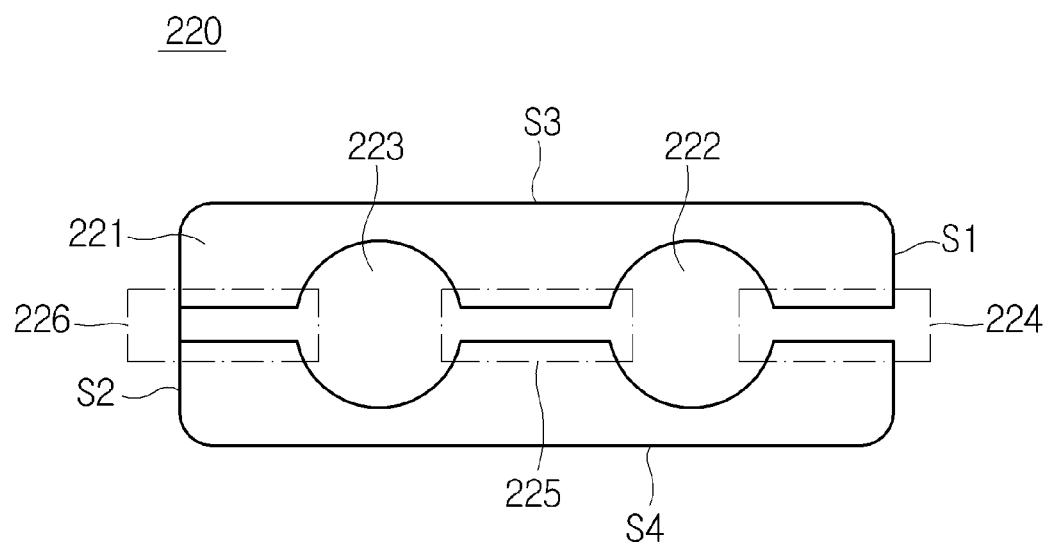
[FIG. 21]
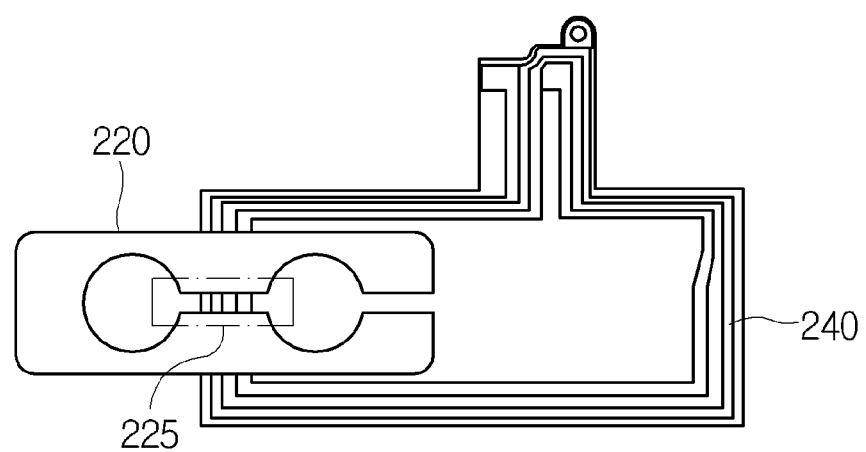

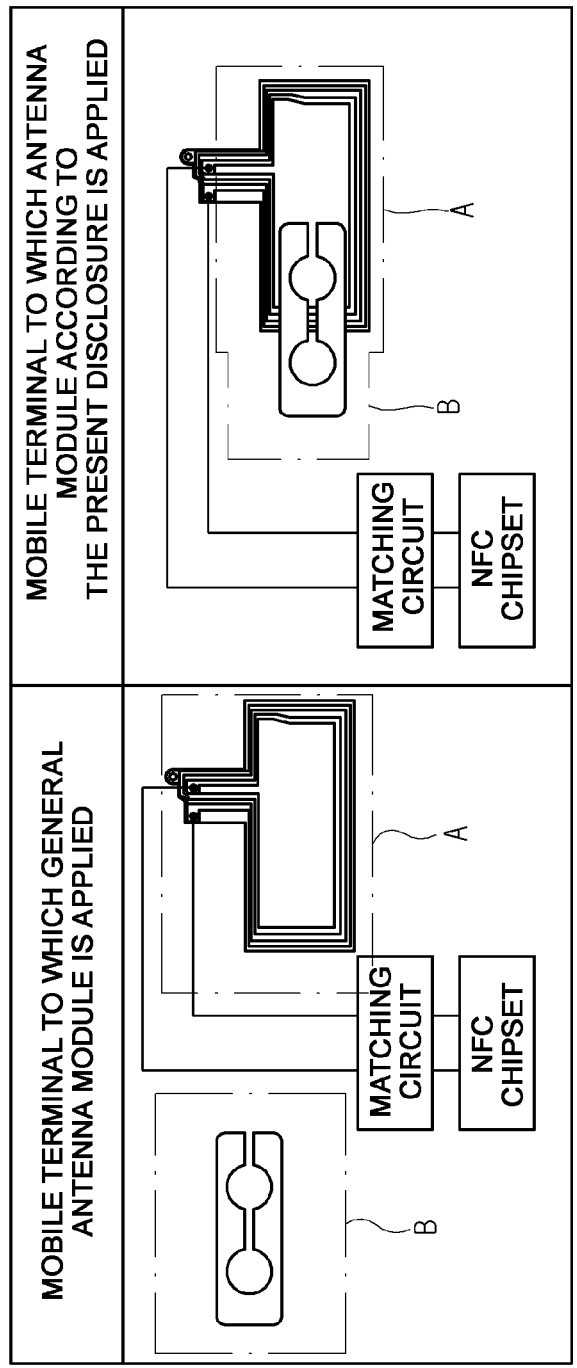
[Fig. 22]

[Fig. 23]

| ITEMS | Card Mode (mm) | | Reader Mode (mm) | | | | | | | |
|---|---|---|---|---|---|---|---|---|---|---|
| | Type A&B | | TYPE 1 | | TYPE 2 | | TYPE 3 | | TYPE F | |
| | | | Topaz | | Ultra Light | | Desfire EV1 | | Sony | |
| | AREA A | AREA B | AREA A | AREA B | AREA A | AREA B | AREA A | AREA B | AREA A | AREA B |
| MOBILE TERMINAL WITH GENERAL ANTENNA MODULE | 64 | X | 28 | X | 36 | X | 17 | X | 10 | X |
| MOBILE TERMINAL WITH ANTENNA MODULE OF THE PRESENT DISCLOSURE | 62 | 5 | 29 | 3 | 37 | 7 | 18 | 5 | 10 | 3 |

ANTENNA MODULE

TECHNICAL FIELD

The present disclosure relates to an antenna module, and more specifically, to an antenna module mounted on a portable terminal to perform near field communication.

BACKGROUND ART

With the development of technology, portable terminals such as a portable phone, a PDA, a PMP, a navigation terminal, and a laptop additionally provide a function of short-range communication between a DMB, a wireless Internet, and a device in addition to basic functions such as call, video/music play, navigation, and the like. Therefore, the portable terminal has a plurality of antenna for wireless communication such as a wireless Internet or a Bluetooth.

In addition, in recent years, there is a trend of applying functions such as information exchange between terminals, payment, ticket reservation, and searching to the portable terminal using short-range communication (i.e., NFC). To this end, the portable terminal is mounted with an antenna module (i.e., NFC antenna module) for a portable terminal used in a short-range communication method. At this time, the used NFC antenna module transmits data between terminals at a close distance of about 10 cm with a contactless short-range wireless communication module using a frequency band of about 13.56 MHz as one of RFIDs. The NFC is widely utilized for the transmission of product information in a supermarket or a general shop or travel information for a visitor, traffic, an access control locking device, and the like as well as the payment.

In recent years, the market of portable terminals such as a tablet and a smartphone is rapidly increasing. Functions such as the information exchange between terminals, payment, ticket reservation, and searching using the short-range communication (i.e., NFC) are tended to be applied to the portable terminal. Therefore, the demand for the NFC antenna module used in the short-range communication method is increasing.

The NFC antenna module is formed in a planar shape and mounted on a battery pack, a back cover (or rear cover) or the like. As an example, the NFC antenna module is composed of a shielding sheet (e.g., metal plate such as a ferrite sheet) laminated on a battery of a portable terminal, and a radiator pattern laminated on the shielding sheet, and mounted inside a battery pack of the portable terminal.

However, the portable terminal mounted with a conventional NFC antenna module enables communication only in an area in which a radiation pattern is disposed, thereby causing shadow. Since the portable terminal mounted with the conventional NFC antenna module has shadow, there is a problem in that the specific location of the portable terminal mounted with the conventional NFC antenna module is required to be close to a reader or a tag upon short-range communication.

DISCLOSURE

Technical Problem

The present disclosure is proposed to solve the above conventional problem, and an object of the present disclosure is to provide an antenna module, which uses a metal deco of a portable terminal as an auxiliary radiator of a near field communication radiation pattern, thereby increasing a recognition area.

In addition, another object of the present disclosure is to provide an antenna module, which disposes a deco panel of the portable terminal by overlapping a radiation pattern, and uses the deco panel as an auxiliary radiator through the coupling with the radiation pattern, thereby increasing a recognition area.

Technical Solution

In order to achieve the objects, an antenna module according to an exemplary embodiment of the present disclosure includes: a metal deco disposed on the rear surface of a portable terminal and a radiation pattern connected to the metal deco, in which the metal deco has both ends spaced apart from each other by a slit, and one end directly connected to one end of the radiation pattern and is configured to be operated as an auxiliary radiator of the radiation pattern.

The metal deco may be disposed along the outer circumference of a deco panel on which at least one of a camera and a flash of the portable terminal is disposed, or disposed along the outer circumference of a hole formed in a deco panel of the portable terminal. At this time, the metal deco may have a frame shape in which a through hole having a deco panel of the portable terminal disposed therein is formed.

A first end of the metal deco may be connected to a first end of the radiation pattern, a second end of the metal deco may be connected to one of a matching circuit and a communication chipset of the portable terminal, and a second end of the radiation pattern may be connected to one of a matching circuit and a communication chipset.

The antenna module according to the exemplary embodiment of the present disclosure may further include: a conductive member for directly connecting the metal deco to the radiation pattern.

In order to achieve the objects, an antenna module according to another exemplary embodiment of the present disclosure includes: a deco panel disposed on the rear surface of a portable terminal and a radiation pattern overlapping the deco panel, in which the deco panel includes: a plurality of through holes and a slit for connecting two adjacent through holes, and the radiation pattern overlaps the slit.

The deco panel may include: a base plate made of a metallic material, a first through hole for penetrating the base plate, a second through hole spaced apart from the first through hole to penetrate the base plate, a first slit formed from one of the first through hole and the second through hole to the outer circumference of the base plate, and a second slit formed from the first through hole to the second through hole. At this time, the radiation pattern may overlap the second slit.

The deco panel may further include: a third slit formed from the other one of the first through hole and the second through hole to the outer circumference of the base plate. At this time, the first slit may be formed up to one side of four sides of the base plate, and the third slit may be connected to the other side disposed to face one side to which the first slit is connected.

The deco panel may be coupled with the radiation pattern in the slit to be operated as an auxiliary radiator of the radiation pattern.

Advantageous Effects

According to the present disclosure, the antenna module may connect the metal deco to the radiation pattern and use the metal deco as the auxiliary radiator, thereby minimizing the shadow of the portable terminal in the near field communication (NFC) band to increase the recognition area.

In addition, the antenna module may dispose the deco panel by overlapping the radiation pattern, and use the deco panel as the auxiliary radiator through the coupling with the radiation pattern, thereby minimizing the shadow of the portable terminal in the near field communication (NFC) band to increase the recognition area.

DESCRIPTION OF DRAWINGS

FIG. 1 is a diagram for explaining an antenna module according to a first exemplary embodiment of the present disclosure.

FIG. 2 is a diagram for explaining a configuration of the antenna module according to the first exemplary embodiment of the present disclosure.

FIGS. 3 to 7 are diagrams for explaining a metal deco illustrated in FIG. 2.

FIGS. 8 and 9 are diagrams for explaining a radiation pattern illustrated in FIG. 2.

FIGS. 10 and 11 are diagrams for comparing and explaining the antenna module according to the first exemplary embodiment of the present disclosure and a general antenna module.

FIG. 12 is a diagram for explaining an antenna module according to a second exemplary embodiment of the present disclosure.

FIG. 13 is a diagram for explaining a configuration of the antenna module according to the second exemplary embodiment of the present disclosure.

FIGS. 14 to 20 are diagrams for explaining a deco panel illustrated in FIG. 13.

FIG. 21 is a diagram for explaining a radiation pattern illustrated in FIG. 20.

FIGS. 22 and 23 are diagrams for comparing and explaining the antenna module according to the second exemplary embodiment of the present disclosure and the general antenna module.

MODE FOR INVENTION

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings. In addition, in describing the present disclosure, when it is determined that the detailed description of the related well-known configuration or function may obscure the gist of the present disclosure, the detailed description thereof will be omitted.

Referring to FIG. 1, an antenna module 100 according to a first exemplary embodiment of the present disclosure uses a metal deco 120 of a portable terminal 10 as an auxiliary radiator in a near field communication (NFC) band. The metal deco 120 is disposed on a deco panel 12 located on the rear surface of the portable terminal 10, and disposed adjacent to the outer circumference of the portable terminal 10. The antenna module 100 directly connects the metal deco 120 with a near field communication radiation pattern 140 to operate the metal deco 120 as the auxiliary radiator, thereby increasing a recognition area in a near field communication band.

Referring to FIG. 2, the antenna module 100 according to the first exemplary embodiment of the present disclosure is configured to include the metal deco 120 and the radiation pattern 140. Here, although it has been illustrated in FIG. 2 that the antenna module 100 does not include a matching circuit 20 and an NFC chipset 30, the antenna module 100 may also be configured to include the matching circuit 20 and the NFC chipset 30.

The metal deco 120 is disposed on the rear surface of the portable terminal 10. At this time, the metal deco 120 is disposed on the rear surface of the portable terminal 10 and exposed to the outside. The metal deco 120 is disposed to be tilted to the side surface of the portable terminal 10 adjacent to the outer circumference of the portable terminal 10. The metal deco 120 is a metal member disposed along the outer circumference of the deco panel 12 disposed on the rear surface of the portable terminal 10.

Referring to FIG. 3, the metal deco 120 may also be a metal member disposed on the outer circumference of a through hole 14 formed in the deco panel 12. The deco panel 12 is a cover member for covering an area in which one or more of a camera, a flash, and a fingerprint recognition sensor of the portable terminal 10 are disposed. The deco panel 12 is formed with the through hole 14 for exposing the camera, the flash, the fingerprint recognition sensor, or the like to the outside. At this time, the metal deco 120 may be configured as a metal member disposed on the outer circumference of the through hole 14 formed in the deco panel 12 to expose the camera, the flash, the fingerprint recognition sensor, or the like to the outside.

The metal deco 120 may be formed in various shapes such as a circular shape, a rectangular shape, and a rectangular shape with rounded edges according to the shape of the deco panel 12. The metal deco 120 is formed with the through hole 14 for exposing the deco panel 12. The metal deco 120 is formed in a frame shape as the through hole 14 for exposing the deco panel 12 is formed on the center thereof.

Referring to FIG. 4, the metal deco 120 is formed with a slit 122. The slit 122 is formed through the inner circumference and outer circumference of the metal deco 120. At this time, the slit 122 penetrates the metal deco 120 through the inner circumference and outer circumference thereof, such that both ends of the metal deco 120 are spaced apart from each other by a predetermined interval. Therefore, the metal deco 120 forms an opening as both ends thereof are spaced apart from each other by the slit 122.

The metal deco 120 may also be formed with a plurality of slits 122. However, since the metal deco 120 has the reduced radiation area if the plurality of slits 122 are formed, or a plurality of pieces of the metal deco 120 are required to be directly connected by a conductive material, a manufacturing process may be complicated, and a manufacturing cost may be increased.

Referring to FIG. 5, the metal deco 120 is connected to the radiation pattern 140 to be operated as the auxiliary radiation pattern 140.

A first end 124 of the metal deco 120 is connected to the radiation pattern 140. The first end 124 of the metal deco 120 is connected to the radiation pattern 140 through a conductive member 160 such as a conductive wire or a conductive pattern.

A second end 126 of the metal deco 120 is connected to the matching circuit 20 or the NFC chipset 30. The second end 126 of the metal deco 120 is connected to the matching circuit 20 or the NFC chipset 30 through the conductive member 160 such as a conductive wire or a conductive pattern formed on a flexible printed circuit board. At this time, the matching circuit 20 or the NFC chipset 30 may be mounted on a main board 16 of the portable terminal 10, or may be configured as a independent printed circuit board and mounted on the portable terminal 10.

Referring to FIG. 6, in order to easily connect the metal deco 120 to the radiation pattern 140, the matching circuit 20, the NFC chipset 30, and the like, the first end 124 and second end 126 of the metal deco 120 may be connected to a connector to which the conductive member 160 is connected.

Referring to FIG. 7, the metal deco 120 is exposed and disposed on the rear surface of the portable terminal 10, and disposed inside the portable terminal 10 of the radiation pattern 140. Therefore, the metal deco 120 may be connected to the conductive member 160 through a connection pattern 180 penetrating a rear cover 15 of the portable terminal 10. As an example, the connector is disposed on the front surface (i.e., one surface of the portable terminal 10 in the front direction) of the rear cover 15, and the metal deco 120 is connected to the connector through the connection pattern 180. The connector is connected to the radiation pattern 140 disposed on the main board 16 through the conductive member 160.

Meanwhile, the connection pattern 180 may also be formed integrally with the conductive member 160. That is, the end of the conductive member 160 may penetrate the rear cover 15 to be connected to the metal deco 120.

Referring to FIGS. 8 and 9, the radiation pattern 140 is formed in a loop shape wound around a winding shaft several times and mounted on the portable terminal 10. The radiation pattern 140 may be one of a conductive loop pattern directly formed on the main board 16, a conductive loop pattern formed on a separate printed circuit board, a conductive loop pattern formed on the front surface (i.e., one surface facing the main body of the portable terminal 10) of the rear cover 15, and a conductive loop pattern molded inside the rear cover 15.

A first end 142 of the radiation pattern 140 is connected to the first end 124 of the metal deco 120. The first end 142 of the radiation pattern 140 is electrically connected to the first end 124 of the metal deco 120 through the conductive member 160 such as a conductive wire or a conductive pattern.

A second end 144 of the radiation pattern 140 is connected to the matching circuit 20 or the NFC chipset 30 mounted on the main board 16. The second end 144 of the radiation pattern 140 is electrically connected to the matching circuit 20 or the NFC chipset 30 through the conductive member 160 such as a conductive wire or a conductive pattern.

In order to easily connect the radiation pattern 140 to the metal deco 120, the matching circuit 20, the NFC chipset 30, and the like, the first end 142 and second end 144 of the radiation pattern 140 may be connected to a connector to which the conductive member 160 is connected.

Referring to FIGS. 10 and 11, the portable terminal 10 to which the general antenna module 100 is applied has shadow in which near field communication is impossible in an area in which the metal deco 120 is disposed. That is, the portable terminal 10 to which the general antenna module 100 is applied is formed with a magnetic field only in an area in which the radiation pattern 140 is disposed, thereby enabling near field communication, and is not formed with the magnetic field in an area in which the metal deco 120 is disposed, thereby causing the shadow in which the near field communication is impossible.

On the other hand, the portable terminal 10 to which the antenna module 100 according to the first exemplary embodiment of the present disclosure is applied may be formed with the magnetic field in the area in which the radiation pattern 140 is disposed and the area in which the metal deco 120 is disposed, thereby removing the shadow in the area in which the metal deco 120 is disposed.

At this time, the portable terminal 10 to which the antenna module 100 according to the first exemplary embodiment of the present disclosure is applied maintains the same levels in the recognition area and the recognition distance in the area in which the metal deco 120 is disposed as those of the portable terminal 10 to which the general antenna module 100 is applied, but has the increased recognition area in the area in which the metal deco 120 is disposed.

As described above, the antenna module 100 according to the first exemplary embodiment of the present disclosure may connect the metal deco 120 to the radiation pattern 140 and use the metal deco 120 as the auxiliary radiator, thereby minimizing the shadow of the portable terminal 10 in the near field communication (NFC) band to increase the recognition area.

Referring to FIGS. 12 and 13, an antenna module 200 according to a second exemplary embodiment of the present disclosure uses a deco panel 220 of the portable terminal 10 as an auxiliary radiator in the near field communication (NFC) band.

The deco panel 220 is a cover member for covering an area in which one or more of a camera, a flash, and a fingerprint recognition sensor of the portable terminal 10 are disposed. The deco panel 220 is formed with a plurality of through holes for exposing the camera, the flash, and the fingerprint recognition sensor to the outside. The deco panel 220 is formed with a slit for connecting the through hole and the outer circumference thereof, or two adjacent through holes.

A radiation pattern 240 overlaps the slit for connecting two through holes, and the deco panel 220 is coupled with the radiation pattern 240 through the slit to be operated as the auxiliary radiator. Here, the coupling means an electromagnetic coupling, rather than directly contacting and coupling the radiation pattern 240 and the deco panel 220.

Therefore, the antenna module 200 according to the second exemplary embodiment of the present disclosure couples the radiation pattern 240 with the deco panel 220 to operate the deco panel 220 as the auxiliary radiator, thereby increasing the recognition area in the near field communication band.

To this end, the antenna module 200 according to the second exemplary embodiment of the present disclosure is configured to include the deco panel 220 and the radiation pattern 240. Here, although it has been illustrated in FIG. 13 that the antenna module 200 does not include the matching circuit 20 and the NFC chipset 30, the antenna module 200 may also be configured to include the matching circuit 20 and the NFC chipset 30.

The deco panel 220 is disposed on the rear surface of the portable terminal 10. The deco panel 220 is disposed on the rear surface of the portable terminal 10 and exposed to the outside. At this time, the deco panel 220 is made of a metallic material in which the coupling with the radiation pattern 240 is possible.

Referring to FIG. 14, the deco panel 220 is configured to include a base plate 221, a first through hole 222, a second through hole 223, a first slit 224, and a second slit 225. Here, although it has been illustrated in FIG. 14 that two through holes are formed in the deco panel 220, the present disclosure is not limiter thereto and the through hole may be further formed therein.

The base plate 221 is a plate-shaped board made of a metallic material. The base plate 221 is made of a metallic material in which the coupling with the radiation pattern 240 is possible. At this time, the base plate 221 includes a first side S1, a second side S2, a third side S3, and a fourth side S4. The first side S1 and the second side S2 face each other, and the third side S3 and the fourth side S4 face each other.

The first through hole 222 is formed to penetrate the base plate 221, the first through hole 222 is disposed to be spaced apart from the second through hole 223 by a predetermined interval. As an example, the first through hole 222 is a hole for exposing the camera of the portable terminal 10.

The second through hole 223 is formed to penetrate the base plate 221. The second through hole 223 is disposed to be spaced apart from the first through hole 222 by a predetermined interval. As an example, the second through hole 223 is a hole for exposing the flash of the portable terminal 10.

The first slit 224 is formed between the second through hole 223 and the outer circumference of the base plate 221. The first slit 224 is formed starting from the outer circumference of the second through hole 223 to the outer circumference of the base plate 221. At this time, one side of the first side S2, the third side S3, and the fourth side S4 of the base plate 221 is formed with an opening by the first slit 224.

As an example, the first slit 224 is formed from the outer circumference of the second through hole 223 to the first side S1 of the base plate 221, and the base plate 221 is formed with an opening in the first side S1.

As another example, referring to FIGS. 15 and 16, the first slit 224 may be formed up to one side of the second side S2 and the fourth side S4 of the base plate 221, and the base plate 221 may be formed with an opening in one of the third side S3 and the fourth side S4 thereof.

Meanwhile, referring to FIGS. 17 to 19, the first slit 224 may also be formed between the first through hole 222 and the outer circumference of the base plate 221. The first slit 224 is formed starting from the outer circumference of the first through hole 222 to the outer circumference of the base plate 221. At this time, the first slit 224 is formed up to one side of the second side S2, the third side S3, and the fourth side S4 of the base plate 221, and one side of the second side S2, the third side S3, and the fourth side S4 of the base plate 221 is formed with an opening by the first slit 224.

The second slit 225 is formed between the first through hole 222 and the second through hole 223. That is, the second slit 225 is formed starting from the outer circumference of the first through hole 222 to the outer circumference of the second through hole 223. At this time, the second slit 225 is formed up to the outer circumference thereof adjacent to the first through hole 222.

Referring to FIG. 20, the deco panel 220 may further include a third slit 226 formed starting from one of the first through hole 222 and the second through hole 223 to the outer circumference of the base plate 221. That is, when the first slit 224 is formed in the first through hole 222, the third slit 226 is formed from the second through hole 223 to the outer circumference of the base plate 221. When the first slit 224 is formed in the second through hole 223, the third slit 226 is formed from the first through hole 222 to the outer circumference of the base plate 221. At this time, the base plate 221 is divided into a first plate and a second plate through the first slit 224 to the third slit 226.

The radiation pattern 240 is formed in a loop shape wound around a winding shaft several times and mounted on the portable terminal 10. The radiation pattern 240 may be one of a conductive loop pattern directly formed on the main board 16, a conductive loop pattern formed on a separate printed circuit board, a conductive loop pattern formed on the front surface (i.e., one surface facing the main body of the portable terminal 10) of the rear cover 15, and a conductive loop pattern molded inside the rear cover 15.

Referring to FIG. 21, the radiation pattern 240 overlaps the deco panel 220. That is, a part of the radiation pattern 240 overlaps the second slit 225 of the deco panel 220. The part of the radiation pattern 240 is disposed between the first through hole 222 and second through hole 223 of the deco panel 220 to overlap the second slit 225.

The radiation pattern 240 is coupled with the deco panel 220 through the second slit 225. The deco panel 220 is coupled with the radiation pattern 240 to be operated as the auxiliary radiator. Here, the coupling means an electromagnetic coupling, rather than directly contacting and coupling the radiation pattern 240 and the deco panel 220.

Both ends of the radiation pattern 240 are connected to the matching circuit 20 or the NFC chipset 30 mounted on the main board 16. Both ends of the radiation pattern 240 are electrically connected to the matching circuit 20 or the NFC chipset 30 through a conductive member such as a conductive wire or a conductive pattern.

In order to easily connect the radiation pattern 240 to the matching circuit 20, the NFC chipset 30, and the like, both ends of the radiation pattern 240 may be connected to a connector to which the conductive member is connected.

Referring to FIGS. 22 and 23, the portable terminal 10 to which the general antenna module 200 is applied has shadow in which near field communication is impossible in an area in which the deco panel 220 is disposed. That is, the portable terminal 10 to which the general antenna module 200 is applied is formed with a magnetic field only in an area in which the radiation pattern 240 is disposed, thereby enabling near field communication, and is not formed with the magnetic field in an area in which the deco panel 220 is disposed, thereby causing the shadow in which the near field communication is impossible.

On the other hand, the portable terminal 10 to which the antenna module 200 according to the second exemplary embodiment of the present disclosure is applied may be formed with the magnetic field in the area in which the radiation pattern 240 is disposed and the area in which the deco panel 220 is disposed, thereby removing the shadow in the area in which the deco panel 220 is disposed.

At this time, the portable terminal 10 to which the antenna module 200 according to the second exemplary embodiment of the present disclosure is applied maintains the same levels in the recognition area and the recognition distance in the area in which the deco panel 220 is disposed as those of the portable terminal 10 to which the general antenna module 200 is applied, but has the increased recognition area in the area in which the deco panel 220 is disposed.

As described above, the antenna module 200 according to the second exemplary embodiment of the present disclosure may dispose the deco panel 220 to overlap the radiation pattern 240, and use the deco panel 220 as the auxiliary radiator through the coupling with the radiation pattern 240, thereby minimizing the shadow of the portable terminal 10 in the near field communication (NFC) band to increase the recognition area.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An antenna module comprising:
   a deco panel disposed on the rear surface of a portable terminal;
   and a radiation pattern overlapping the deco panel, wherein the deco panel comprises:
   a plurality of through holes and a slit for connecting two adjacent through holes, and the radiation pattern overlaps the slit; a base plate made of a metallic material;
   a first through hole for penetrating the base plate;
   a second through hole spaced apart from the first through hole to penetrate the base plate;
   a first slit formed from the first through hole to an outer circumference of the base plate to form an opening at one side of the base plate; and
   a second slit formed from the first through hole to the second through hole;
   and wherein the deco panel couples with the radiation pattern to operate as an auxiliary radiator of the radiation pattern.

2. The antenna module of claim 1,
   wherein the radiation pattern overlaps the second slit.

3. The antenna module of claim 1,
   wherein the deco panel further comprises: a third slit formed from the second through hole to the outer circumference of the base plate.

4. The antenna module of claim 3,
   wherein the first slit is formed up to one side of four sides of the base plate, and
   wherein the third slit is connected to another side disposed to face one side to which the first slit is connected.

5. The antenna module of claim 1,
   wherein the deco panel is coupled with the radiation pattern in the slit to be operated as an auxiliary radiator of the radiation pattern.

* * * * *